July 21, 1959
J. MACHLIS
2,896,081
TIME BASE GENERATOR
Filed June 18, 1956
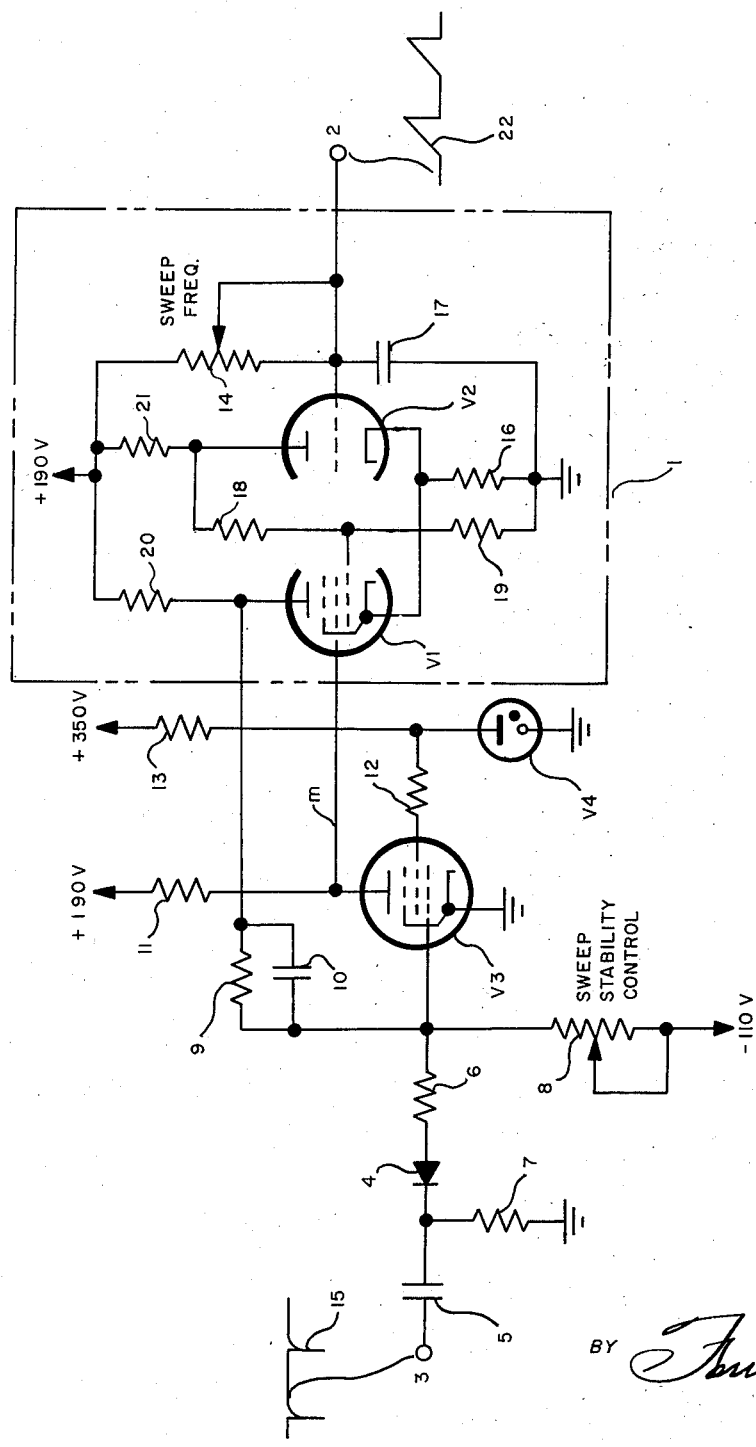
Jerome Machlis
INVENTOR
BY *[signature]*
ATTORNEY weight: 1959-07-21;"

United States Patent Office 2,896,081
Patented July 21, 1959

2,896,081

TIME BASE GENERATOR

Jerome Machlis, Granada Hills, Calif., assignor, by mesne assignments, to Hymac Corporation, Los Angeles, Calif., a corporation of California Application June 18, 1956, Serial No. 592,129

6 Claims. (Cl. 250—27)

This invention relates generally to sweep generators and more particularly to a sawtooth voltage, time base generator capable of both free-running (astable) and triggered (monostable) operation.

The internal sweep generator of an oscilloscope, for example, can be either astable (free-running) and synchronized by various generated signals, or it can be monostable (one-shot) and be triggered by incoming signals. The latter mode of operation is highly desirable since it ensures positive synchronization with little tendency to jitter and is exclusively used in the analysis of transient and pulse phenomena.

It is an object of this invention to provide a sawtooth voltage generator which is capable of both free-running operation and triggered operation.

Another object of the invention is to provide simple control means for changing the state of operation of a sawtooth voltage generator from a free-running condition to triggered operation, and vice versa.

A further object of this invention is to provide a sawtooth generator having suitable input means for accepting correct polarity input trigger pulses and to isolate the sawtooth generator from a pulse source.

Briefly, the foregoing and other objects are preferably accomplished by providing a modified cathode-coupled multivibrator which is normally a free-running sawtooth voltage generator having input control means for varying a control bias to convert the free-running generator to a triggered operation generator. The input means include a network which accepts suitable trigger input pulses to actuate the sawtooth generator when the generator is placed in triggered operation.

The invention possesses other objects and features, some of which together with the foregoing, will be set forth in the following description of a preferred embodiment of the invention, and the invention will be more fully understood by reference to the attached drawing in which the single figure is a preferred schematic wiring diagram of the time base generator.

There is shown in the single figure of the accompanying drawing a preferred embodiment of the present invention. A sawtooth voltage generator 1, which is fully shown, described and claimed in a companion application of Rudolph L. Kuehn and Robert K. Seigle, Serial No. 586,287, filed May 21, 1956, is generally adapted to operate in a free-running (astable) manner. The sawtooth generator 1 comprises two electronic tubes V1 and V2 which are connected to form a modified cathode-coupled multivibrator producing a sawtooth output voltage on output terminal 2. This output voltage can be used in oscilloscope deflection systems, for example, as a time base sweep signal.

The sawtooth generator 1 is controlled to operate in either a free-running or triggered manner by a network shown connecting a trigger input terminal 3 and the sawtooth generator 1. The input terminal 3 is connected to a rectifier 4 by a coupling capacitor 5, and the rectifier 4 is connected to the control grid of an electronic tube V3 by an isolating resistor 6. The common junction of capacitor 5 and rectifier 4 is connected to ground through resistor 7. Rectifier 4 is oriented to pass negative input signals.

The control grid of tube V3 is connected to a negative bias of −110 volts D.C., for example, through an adjustable resistor 8 and also to the plate of tube V1 by resistor 9 which is shunted by "speed-up" capacitor 10. The plate of V3 is connected to a plate supply of +190 volts D.C., for example, through plate resistor 11 and also to the screen grid of V1 by a direct connection m. The cathode of V3 is directly grounded.

The screen grid of V3 is connected to +350 volts D.C., for example, through two series connected resistors 12 and 13. The common junction of these two resistors 12 and 13 is grounded through a glow-discharge voltage regulator tube V4.

For monostable (triggered) operation, the trigger tube V3 is adjusted by the sweep stability control resistor 8 to be normally conducting without the presence of input signal. This is the case when resistor 8 is adjusted to provide a bias just above cutoff for the trigger tube V3. A suitably positioned stop can be located in the resistor 8 to determine a proper bias point. When V3 is conducting, its plate voltage is very low, and this low voltage, impressed on the screen grid of tube V1 by way of lead m, prevents conduction of V1 whenever V3 is conducting. Thus, since the screen grid of V1 is connected to the plate of V3, the screen potential is too low for the multivibrator (V1—V2) to operate when V3 is conducting.

With tube V1 thus "cutoff," the second tube V2 of the multivibrator is now conducting. Since the grid resistor 14 of V2 is connected to a source of high positive potential of +190 volts D.C., for example, the grid voltage will be clamped by the grid current in the grid-cathode circuit.

Therefore, V2 and V3 are each conducting and V1 is not conducting. A negative pulse 15 applied to input terminal 3 is fed to the grid of V3 and reduces the plate current of V3 so that the plate voltage of V3 increases, and so that the screen potential of V1 quickly reaches an operating potential such that V1 conducts. This action causes positive feedback to occur in two paths.

First, the plate potential of V1 drops, causing the grid potential of V3 to go toward and finally to cutoff. This negative voltage drop is blocked from appearing back at input terminal 3 by rectifier 4 and is thus isolated from apparatus connected to terminal 3. This feedback path, consisting of resistor 9 and capacitor 10 in parallel, maintains V3 at cutoff for as long as V1 can conduct. Essentially, the behavior of V1 and V3 is that of a bistable multivibrator.

A second feedback path is provided by the mutual coupling of cathodes by resistor 16. The increase in V1 current causes V2 to tend to cutoff because of a rise in grid-to-cathode voltage developed by the increased current flow through resistor 16. The resulting increase in the plate potential of V2 raises further the control grid potential of V1 toward positive, resulting in V1 conducting, while V2 proceeds to cutoff.

Thus V1 conducts and V2 and V3 are cutoff. Capacitor 17 now charges towards the positive plate supply potential of +190 volts D.C. and when the grid potential of V2 exceeds the cutoff potential, V2 will conduct and cutoff V1 through the feedback paths of resistor 16 and of resistors 18 and 19. It is noted that the plates of tubes V1 and V2 are respectively connected to +190 volts through resistors 20 and 21. The rise in grid potential of V2 appears on output terminal 2 as a sawtooth 22, the rise beginning with the appearance of the negative pulse 15 and the drop occurring with the conduction of V2 discharging capacitor 17. When V1 is cutoff, its plate potential rises, which increases the positive grid potential of V3, causing V3 to conduct.

The system recycles as described above when another negative trigger pulse is applied at input terminal 3 to the grid of V3.

The sawtooth generator 1 can be placed in a free-running condition when desired by simply adjusting the sweep stability control resistor 8 to cutoff the trigger tube V3. Another position stop can be located on resistor 8 in the other direction to determine a suitable bias point. This causes sawtooth generator 1 to operate in a normal recurrent, free-running mode. The sweep frequency can be adjusted in this condition by the variable sweep frequency resistor 14 which controls the R-C charging time constant for capacitor 17.

Although component values have not been shown in the drawing, and without placing any specific limitation on the scope of the invention, the following values are found to provide a satisfactory operating generator.

| | | |
|---|---|---|
| 5 | mmf | 5600 |
| 6 | k | 10 |
| 7 | k | 470 |
| 8 | k | 430 |
| 9 | k | 390 |
| 10 | mmf | 470 |
| 11 | k | 39 |
| 12 | k | 2.7 |
| 13 | k | 15 |
| 14 | meg | 12 |
| 16 | k | 10 |
| 17 | mmf | 5600 |
| 18 | k | 15 |
| 19 | k | 47 |
| 20 | k | 10 |
| 21 | k | 39 |
| V1 | | ½ 6AN8 |
| V2 | | ½ 6AN8 |
| V3 | | 6AU6 |
| V4 | | OB2 |

The tube V4 conducts excess screen grid current of tube V3, and V4 can be eliminated by connecting the cathode of V3 to a negative bias instead of to ground as shown. The plate of V3, when conducting, can be brought nearer to ground potential then, and V4 would be unnecessary. The values of resistors 8 and 9 would be different than those shown above for this condition.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

In order to comply with the statute, the invention has been described in language more or less specific as to structural features. It is to be understood, however, that the invention is not limited to the specific features shown, but that the means and construction herein disclosed comprise the preferred form of several modes of putting the invention into effect. The invention is, therefore, claimed in any of its forms or modifications within the legitimate and valid scope of the appended claims.

What is claimed is:

1. A time base generator, comprising: a pair of electron discharge devices connected as an astable operating multivibrator; an input for accepting trigger signals; a third, normally conducting electron discharge device connecting said input to said multivibrator, said third electron discharge device placing said multivibrator in a first conducting state for monostable operation, each said input trigger signals operating to cut off said third electron discharge device and place said multivibrator in a second conducting state for a predetermined length of time, from said first conducting state; and a feedback network connecting said multivibrator and said third electron discharge device for maintaining non-conduction of said third electron discharge device when said multivibrator is in said second conducting state, said feedback network including a resistor and a capacitor connected in parallel.

2. A time base generator, comprising: a first and second electron discharge device connected as an astable operating multivibrator, said first elecron discharge device including a screen control grid and an anode; an input for accepting trigger signals; a third, normally conducting electron discharge device including a control grid and anode; means connecting said input to the control grid of said third electron discharge device; a connection from the anode of said third electron discharge device to the screen control grid of said first electron discharge for normally placing said multivibrator in a first conducting state for monostable operation, each said input trigger signals operating to cut off said third electron device and place said multivibrator in a second conducting state for a predetermined length of time, from said first conducting state; and a feedback network connecting the anode of said first electron discharge device to the control grid of said third electron discharge device for maintaining non-conduction of said third electron device when said multivibrator is in said second conducting state, said feedback network consisting of a resistor and a capacitor connected in parallel.

3. A time base generator for both astable and monostable operation, comprising: a pair of electron discharge devices connected as an astable operating multivibrator; an input for accepting negative trigger signals; a third, normally conducting electron discharge device connecting said input to said multivibrator, said third electron discharge device placing said multivibrator in a first conducting state for monostable operation, each said input trigger signals operating to cut off said third electron discharge device and place said multivibrator in a second conducting state for a predetermined length of time, from said first conducting state; a feedback network consisting of a resistor and a capacitor in parallel connecting said multivibrator and said third electron discharge device for maintaining non-conduction of said third electron discharge device when said multivibrator is in said second conducting state; and control means independently operable to cut off said third electron device for isolating said multivibrator from said input trigger signals, for astable operation.

4. The invention according to claim 3 including, in addition, unidirectional rectifying means connecting said input to said third electron discharge device, for preventing said feedback network from presenting a feedback signal to said input.

5. A time base generator for both astable and monostable operation, comprising: a first electron discharge device including a cathode, first control grid, second control grid and an anode, and a second electron discharge device including a cathode, control grid and an anode, the cathode, first control grid and anode of said first electron discharge device and the cathode, control grid and anode of said second electron discharge device being adapted and interconnected in an astable operating multivibrator; an input for accepting negative trigger signals; a third, normally conducting electron discharge device including a cathode, control grid and an anode; means for impressing a supply voltage across the cathode and anode of said third electron discharge device; means connecting said input to the control grid of said third electron discharge device; a connection from the anode of said third electron discharge device to the second control grid of said first electron discharge device for normally placing said multivibrator in a first conducting state for monostable operation, each negative trigger signal applied at said input operating to cut off said third electron discharge device and place said multivibrator in a second conducting state for a predetermined length of time, from said first conducting state; a feedback network consisting of a resistor and a capacitor in parallel connecting the anode of said first electron discharge device to the control grid of said third electron discharge device for maintaining non-conduction of said third electron discharge device when said multivibrator is in the second conducting state; means for applying a bias to the control grid of said third electron discharge device; and means for varying the bias on the control grid of said third electron discharge device, for controlling conduction through said third electron discharge device.

6. The invention according to claim 5 wherein said means connecting said input to the control grid of said third electron discharge device includes a rectifier oriented to prevent said feedback network from presenting a feedback signal to said input.

References Cited in the file of this patent

UNITED STATES PATENTS

| 2,661,421 | Talamini et al. | Dec. 1, 1953 |
| 2,684,442 | Gray et al. | July 20, 1954 |
| 2,764,343 | Diener | Sept. 25, 1956 |